(12) United States Patent
Ha et al.

(10) Patent No.: US 11,669,208 B2
(45) Date of Patent: Jun. 6, 2023

(54) TOUCH DISPLAY DEVICE AND DISPLAY PANEL

(71) Applicant: LG DISPLAY CO., LTD., Seoul (KR)

(72) Inventors: SuHo Ha, Gyeonggi-do (KR); EunSup Yoon, Gyeonggi-do (KR); Laebong Jang, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/897,497

(22) Filed: Aug. 29, 2022

(65) Prior Publication Data

US 2023/0143393 A1 May 11, 2023

(30) Foreign Application Priority Data

Nov. 5, 2021 (KR) ........................ 10-2021-0151647

(51) Int. Cl.
*G06F 3/041* (2006.01)
*G09G 3/3233* (2016.01)
*G06F 3/044* (2006.01)

(52) U.S. Cl.
CPC ........ *G06F 3/04184* (2019.05); *G06F 3/0412* (2013.01); *G06F 3/0443* (2019.05); *G09G 3/3233* (2013.01); *G06F 2203/04103* (2013.01); *G06F 2203/04107* (2013.01); *G09G 2300/0426* (2013.01); *G09G 2300/0842* (2013.01); *G09G 2300/0861* (2013.01); *G09G 2354/00* (2013.01)

(58) Field of Classification Search
None
See application file for complete search history.

(56) References Cited

U.S. PATENT DOCUMENTS 11,379,068 B1 * 7/2022 Kim .................... G06F 3/0412
2020/0201475 A1 * 6/2020 Mani ................... G06F 3/0412

FOREIGN PATENT DOCUMENTS

CN 101251783 A * 8/2008 ........... G06F 3/0412

* cited by examiner

*Primary Examiner* — Duane N Taylor, Jr.
(74) *Attorney, Agent, or Firm* — Polsinelli PC

(57) ABSTRACT

A touch display device includes a display layer including a light emitting layer, a touch layer including a touch electrode, a metal shielding layer disposed between the light emitting layer and the touch electrode, a reference signal line electrically connected to the metal shielding layer, and a compensation circuit that supplies a reference signal through the reference signal line.

20 Claims, 16 Drawing Sheets

TOUCH DISPLAY DEVICE AND DISPLAY PANEL

CROSS-REFERENCE TO RELATED APPLICATION

This application claims the priority of Korean Patent Application No. 10-2021-0151647, filed on Nov. 5, 2021, which is hereby incorporated by reference in its entirety.

BACKGROUND

Field of the Disclosure

The present disclosure relates to a touch display device and a display panel capable of improving touch performance and reducing noise.

Description of the Background

As information society develops, the demand for display devices for displaying images is increasing in various forms. As a display device, various display devices such as a liquid crystal display device, an electroluminescent display device, or a quantum dot light emitting display device have been utilized.

Such a display device provides a function of recognizing a user's finger touch or pen touch on a display panel and performing input processing based on the recognized touch in order to provide more various functions.

As an example, a touch display device capable of recognizing a touch may include a plurality of touch electrodes disposed or embedded in a display panel and detect the presence of a user's touch on the display panel, touch coordinates, and the like by driving such touch electrodes.

Such a touch display device tend to expand a range of use for not only a mobile device such as a smart phone and a tablet PC but also a large-screen touch display device such as a display for automobiles and exhibitions.

As a screen of the touch display device increases, a signal delay may occur while transmitting a touch signal and noise may occur due to electromagnetic interference between the touch signal and a display signal during touch driving or display driving.

Such signal delay and noise may not only deteriorate the quality of an image displayed on the display panel but also deteriorate touch performance, and thus a method capable of reducing the delay of the touch signal and reducing the noise is required.

The above information disclosed in this Background section is only for enhancement of understanding of the background of the described technology and therefore it may contain information that does not form prior art that is already known to a person of ordinary skill in the art.

SUMMARY

Accordingly, the present disclosure is to provide a touch display device and a display panel capable of improving touch performance and reducing noise.

More specifically, the present disclosure is to provide a touch display device and a display panel capable of reducing noise caused by a touch signal and a display signal during touch driving operation or display driving operation by disposing a metal shielding layer between a touch electrode and a light emitting layer.

In addition, the present disclosure is to provide a touch display device and a display panel capable of reducing a delay of a touch signal and improving touch performance by applying a reference signal that may be commonly used for touch driving operation and display driving operation to a metal shielding layer between a touch electrode and a light emitting layer.

Further, the present disclosure is to provide a touch display device and a display panel capable of reducing a delay of a touch signal and improving touch performance by applying a reference signal capable of canceling noise to a metal shielding layer between a touch electrode and a light emitting layer.

In various aspects of the present disclosure, a touch display device includes a display layer including a light emitting layer; a touch layer including a touch electrode; a metal shielding layer disposed between the light emitting layer and the touch electrode; a reference signal line electrically connected to the metal shielding layer; and a compensation circuit configured to supply a reference signal through the reference signal line.

In various aspects of the present disclosure, a display panel includes a display layer including a light emitting layer; a touch layer including a touch electrode; a metal shielding layer disposed between the light emitting layer and the touch electrode; and a reference signal line electrically connected to the metal shielding layer.

According to various aspects of the present disclosure, a touch display device and a display panel capable of improving touch performance and reducing noise can be provided.

In addition, according to various aspects of the present disclosure, a touch display device and a display panel capable of reducing noise caused by a touch signal and a display signal during touch driving operation or display driving operation by disposing a metal shielding layer between a touch electrode and a light emitting layer can be provided.

In addition, according to various aspects of the present disclosure, a touch display device and a display panel capable of reducing a delay of a touch signal and improving touch performance by applying a reference signal that may be commonly used for touch driving operation and display driving operation to a metal shielding layer between a touch electrode and a light emitting layer can be provided.

In addition, according to various aspects of the present disclosure, a touch display device and a display panel capable of reducing a delay of a touch signal and improving touch performance by applying a reference signal capable of canceling noise to a metal shielding layer between a touch electrode and a light emitting layer can be provided.

It is to be understood that both the foregoing general description and the following detailed description are exemplary and explanatory and are intended to provide further explanation of the disclosure as claimed.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
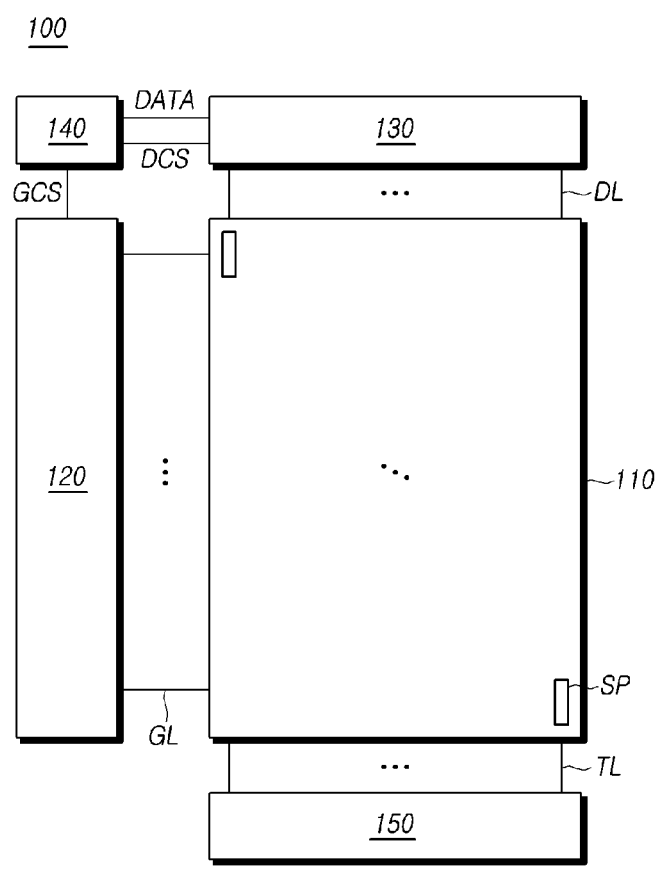
FIG. 1 is a view illustrating a schematic configuration of a touch display device according to aspects of the present disclosure.

Hereinafter, some aspects of the present disclosure will be described in detail with reference to exemplary drawings. In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various aspects of the present disclosure will be described in detail with reference to the accompanying drawings.

FIG. 1 is a view illustrating a schematic configuration of a touch display device according to aspects of the present disclosure.

Referring to FIG. 1, a touch display device 100 according to the aspects of the present disclosure may include a display panel 110, a gate driving circuit 120, a data driving circuit 130, a timing controller 140, and a touch driving circuit 150 for sensing a touch on the display panel 110.

In the display panel 110, a plurality of gate lines GL and a plurality of data lines DL are disposed, and a plurality of subpixels SP is disposed in areas where the gate line GL and the data line DL intersect.

In addition, a plurality of touch electrodes may be disposed or embedded in the display panel 110, and a plurality of touch lines TL may be disposed to electrically connect the touch electrode and the touch driving circuit 150 to each other.

The configuration for display driving in the display device 100 is described first. The gate driving circuit 120 controls a driving timing of the subpixels SP disposed on the display panel 110. Then, the data driving circuit 130 supplies a data voltage corresponding to image data to the subpixel SP. As a result, the subpixel SP emits light with a brightness corresponding to a gradation of the image data to display a image.

Specifically, the gate driving circuit 120 is controlled by the timing controller 140 and sequentially outputs a scan signal to the plurality of gate lines GL disposed on the display panel 110 to control a driving timing of the plurality of subpixels SP.

The gate driving circuit 120 may include one or more gate driving integrated circuits (GDIC) and may be located on only one side of the display panel 110 or on both sides depending on a driving method. Alternatively, the gate driving circuit 120 may be directly embedded in a bezel area of the display panel 110 to be implemented in a form of a gate in panel (GIP).

The data driving circuit 130 receives digital image data DATA from the timing controller 140 and converts the image data into an analog data voltage. In addition, the data voltage is output to each data line DL according to a timing at which the scan signal is applied through the gate line GL so that each subpixel SP expresses brightness according to the data voltage.

The data driving circuit 130 may include one or more source driving integrated circuits (SDIC).

The timing controller 140 supplies various control signals to the gate driving circuit 120 and the data driving circuit 130 and controls operations of the gate driving circuit 120 and the data driving circuit 130.

The timing controller 140 causes the gate driving circuit 120 to output the scan signal according to a timing implemented in each frame and converts the image data received from the outside according to a data signal format used in the data driving circuit 130 to output the converted image data DATA to the data driving circuit 130.

The timing controller 140 receives various timing signals including a vertical synchronization signal, a horizontal synchronization signal, an input data enable signal, a clock signal, and the like from the outside (e.g., a host system) together with the image data.

The timing controller 140 may generate a data control signal DCS and a gate control signal GCS using the various timing signals received from the outside and output the data control signal DCS and the gate control signal GCS to the data driving circuit 130 and the gate driving circuit 120, respectively.

As an example, the timing controller 140 outputs various gate control signals GCS including a gate start pulse, a gate shift clock, a gate output enable signal, and the like in order to control the gate driving circuit 120.

Here, the gate start pulse controls an operation start timing of one or more gate driving integrated circuits constituting the gate driving circuit 120. The gate shift clock is a clock signal commonly input to one or more gate driving integrated circuits and controls a shift timing of the scan signal. The gate output enable signal specifies timing information of one or more gate driving integrated circuits.

In addition, the timing controller 140 outputs various data control signals DCS including a source start pulse, a source sampling clock, a source output enable signal, and the like in order to control the data driving circuit 130.

Here, the source start pulse controls a data sampling start timing of one or more source driving integrated circuits constituting the data driving circuit 130. The source sampling clock is a clock signal that controls a sampling timing of data in each of the source driving integrated circuits. The source output enable signal controls an output timing of the data driving circuit 130.

The touch display device 100 may further include a power management integrated circuit that supplies various voltages or currents to the display panel 110, the gate driving circuit 120, the data driving circuit 130, the touch driving circuit 150, and the like, or controls various voltages or currents to be supplied.

The touch driving circuit 150 senses the presence or absence of a touch and a position where the touch is made in the display panel 110. The touch driving circuit 150 may include a touch sensing circuit that generates a touch driving signal to drive the touch electrode and receives a touch sensing signal generated from the touch electrode, and a touch controller that processes the touch sensing signal to detect the presence or absence of the touch and coordinate information.

The touch sensing circuit and the touch controller of the touch driving circuit 150 may be formed in a form of a single integrated circuit called a read out integrated circuit (ROIC), or may be divided and separated for each function.

Meanwhile, the source driving integrated circuit (SDIC) implementing the data driving circuit 130 and the read out integrated circuit (ROIC) implementing the touch driving circuit 150 may be integrated into one to be configured as a combined integrated circuit (SRIC).

Here, the touch driving circuit 150 may be the read out integrated circuit (ROIC) or the combined integrated circuit (SRIC).

In this case, the touch display device 100 may include at least one source printed circuit board SPCB for circuit connection between the touch driving circuit 150 and other devices.

In this case, the other side of a film on which the touch driving circuit 150 is mounted may be connected to the at least one source printed circuit board (SPCB). That is, one side of the film on which the touch driving circuit 150 is mounted may be electrically connected to the display panel 110 and the other side may be electrically connected to the source printed circuit board (SPCB).

Meanwhile, when an encapsulation layer is formed on an upper portion of the display panel 110 and the touch electrode is disposed thereon, a capacitance for driving the touch electrode may increase. Accordingly, it is necessary to increase a level of the touch driving signal for driving the touch electrode. To this end, a level shifter (not shown) may be added between the touch driving circuit 150 and the display panel 110 to control the level of the touch driving signal.

Each subpixel SP is defined by the intersection of the gate line GL and the data line DL, and a liquid crystal or a light emitting element may be disposed depending on the type of the touch display device 100.

As an example, when the display device 100 is a liquid crystal display device, the display device 100 includes a light source device such as a backlight unit that irradiates light to the display panel 110, and the liquid crystal is disposed on the subpixel SP of the display panel 110. In addition, by adjusting the arrangement of the liquid crystal by an electric field formed when the data voltage is applied to each subpixel SP, the image may be displayed while displaying the brightness according to the data voltage.

In the case of the liquid crystal display device, the display panel 110 may include a liquid crystal layer formed between two substrates, and may be operated in any known mode such as a twisted nematic (TN) mode, a vertical alignment (VA) mode, an in plane switching (IPS) mode, and a fringe field switching (FFS) mode. On the other hand, in the case of an electroluminescent display device, the display panel 110 may be implemented in a top emission method, a bottom emission method, or a dual emission method.

Meanwhile, in the touch display device 100 according to the aspects of the present disclosure, a user's touch on the display panel 110 may be detected using the touch electrode and the touch driving circuit 150 included in the display panel 110.

Figure 2:
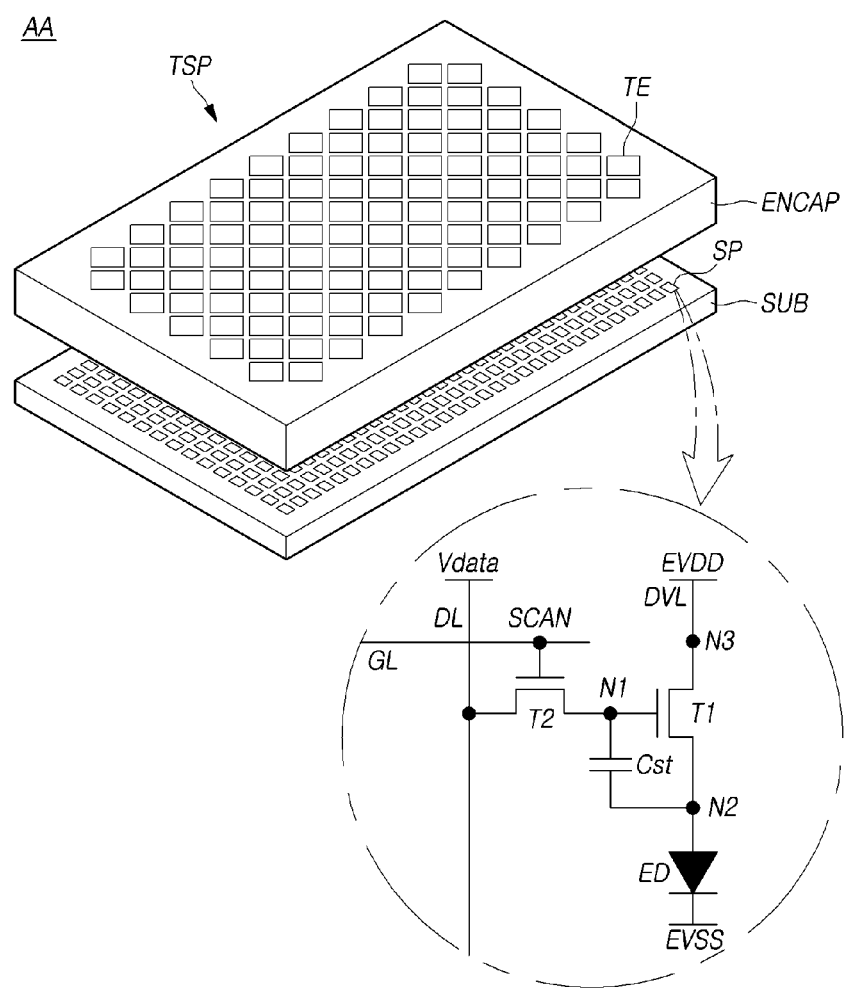
FIG. 2 is a view exemplarily illustrating a structure in which a touch screen panel is embedded in a display panel in the touch display device according to aspects of the present disclosure.

FIG. 2 is a view exemplarily illustrating a structure in which a touch screen panel is embedded in the display panel in the touch display device according to aspects of the present disclosure.

Referring to FIG. 2, in the touch display device 100 according to the aspects of the present disclosure, a plurality of subpixels SP are arranged on a substrate SUB in a display area AA of the display panel 110.

Each subpixel SP may include a light emitting element ED, a first transistor T1 for driving the light emitting element ED, a second transistor T2 for transmitting a data voltage Vdata to a first node N1 of the first transistor T1, a storage capacitor Cst for maintaining a constant voltage for one frame, and the like.

The first transistor T1 may include the first node N1 to which the data voltage Vdata may be applied through the second transistor T2, a second node N2 electrically connected to the light emitting element ED, and a third node N3 to which a driving voltage EVDD is applied from a driving voltage line DVL. The first node N1 may be a gate node, the second node N2 may be a source node or a drain node, and the third node N3 may be a drain node or a source node. The first transistor T1 is referred to as a driving transistor for driving the light emitting element ED.

The light emitting element ED may include a first electrode (e.g., an anode electrode), a light emitting layer, and a second electrode (e.g., a cathode electrode). The first electrode may be electrically connected to the second node N2 of the first transistor T1, and a base voltage EVSS may be applied to the second electrode.

In the light emitting element ED, the light emitting layer may be an organic light emitting layer including an organic material. In this case, the light emitting element ED may be an organic light emitting diode.

On-off of the second transistor T2 may be controlled by a scan signal SCAN applied through a gate line GL, and the second transistor T2 may be electrically connected between the first node N1 of the first transistor T1 and a data line DL. The second transistor T2 may be referred to as a switching transistor.

When the second transistor T2 is turned on by the scan signal SCAN, the data voltage Vdata supplied through the data line DL is transmitted to the first node N1 of the first transistor T1.

The storage capacitor Cst may be electrically connected between the first node N1 and the second node N2 of the first transistor T1.

Each subpixel SP may have a 2T1C (2 Transistor 1 Capacitor) structure including two transistors T1 and T2 and one capacitor Cst, and in some cases, each subpixel SP may further include one or more transistors or one or more capacitors.

The storage capacitor Cst may not be a parasitic capacitor that may exist between the first node N1 and the second node N2 of the first transistor T1 but may be an external capacitor intentionally designed outside the first transistor T1.

Each of the first transistor T1 and the second transistor T2 may be an n-type transistor or a p-type transistor.

Meanwhile, a circuit element such as the light emitting element ED, two or more transistors T1 and T2, and one or more capacitors Cst is disposed in the display panel 110. Since the circuit element is vulnerable to external moisture or oxygen, an encapsulation layer ENCAP for preventing external moisture or oxygen from penetrating into the circuit element may be disposed on the display panel 110.

In the touch display device 100 according to the aspects of the present disclosure, a touch screen panel TSP may be formed on the encapsulation layer ENCAP to be embedded in the display panel 110. That is, in the touch display device 100, a plurality of touch electrodes TE constituting the touch screen panel TSP may be disposed on the encapsulation layer ENCAP to configure the display panel 110.

In this case, when the encapsulation layer ENCAP is formed of a plurality of layers, the touch electrode TE may be disposed between any first encapsulation layer and any second encapsulation layer.

The touch display device 100 may sense a touch using a mutual capacitance method or a self-capacitance method as a capacitance-based touch sensing method.

In the case of the mutual capacitance-based touch sensing method, the plurality of touch electrodes TE may be classified into a touch driving electrode to which a touch driving signal is applied through a touch driving line and a touch sensing electrode in which a touch sensing signal is sensed through a touch sensing line and which forms a touch driving electrode and a capacitance. In this case, the touch driving line and the touch sensing line may be referred to as a touch line, and the touch driving signal and the touch sensing signal may be referred to as a touch signal.

In this case, an area of the touch driving electrode to which the touch driving signal is applied and an area of the touch sensing electrode to which the touch sensing signal is transmitted may be the same or different.

For example, when it is desired to relatively reduce a parasitic capacitance due to the touch sensing electrode to which the touch sensing signal is transmitted, the area of the touch sensing electrode may be formed smaller than the area of the touch driving electrode. In this case, the area of the touch driving electrode to which the touch driving signal is applied and the area of the touch sensing electrode to which the touch sensing signal is transmitted may be formed in a ratio of 5:1 to 2:1. As an example, the area of the touch driving electrode and the area of the touch sensing electrode may be formed in a ratio of 4:1.

In the case of the mutual capacitance-based touch sensing method, the presence or absence of a touch and touch coordinates are detected based on a change in mutual capacitance that occurs between the touch driving electrode and the touch sensing electrode according to the presence or absence of a pointer such as a finger or a pen.

In the case of the self-capacitance-based touch sensing method, each touch electrode TE serves as both the touch driving electrode and the touch sensing electrode. That is, the touch driving signal is applied to the touch electrode TE through one touch line, and the touch sensing signal transmitted from the touch electrode TE to which the touch driving signal is applied is received through the same touch line. Therefore, in the self-capacitance-based touch sensing method, there is no distinction between the touch driving electrode and the touch sensing electrode and distinction between the touch driving line and the touch sensing line.

In the case of the self-capacitance-based touch sensing method, the presence or absence of a touch and touch coordinates are detected based on a change in capacitance generated between a pointer such as a finger or a pen and the touch electrode TE.

As described above, the touch display device 100 may sense the touch using the mutual capacitance-based touch sensing method or may sense the touch using the self-capacitance-based touch sensing method.

Figure 3:
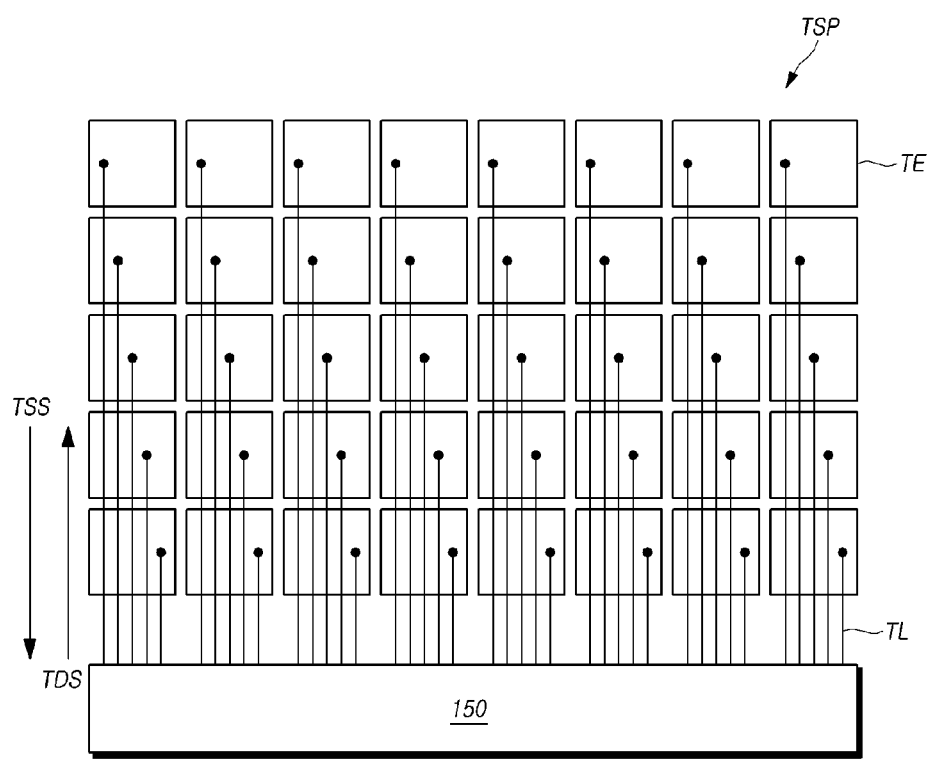
FIG. 3 is a view exemplarily illustrating an arrangement of a touch electrode and a touch line in the touch display device according to aspects of the present disclosure.

FIG. 3 is a view exemplarily illustrating an arrangement of a touch electrode and a touch line in the touch display device according to aspects of the present disclosure.

Referring to FIG. 3, the touch display device 100 according to the aspects of the present disclosure may include the touch screen panel TSP on which the plurality of touch electrodes TE are disposed in order to sense the touch by a pen or a finger and the touch driving circuit 150 for driving the same.

The touch display device 100 may provide a capacitance-based touch sensing function. As an example, the touch may be sensed based on a capacitance (mutual capacitance) between the plurality of touch electrodes TE, and as another example, the touch may be sensed based on a capacitance (self-capacitance) between the touch electrode TE and a touch object (e.g., a finger, a pen, etc.).

For example, the touch display device 100 may provide a self-capacitance-based touch sensing function that senses a touch input by measuring a capacitance formed by each touch electrode TE with the finger or a change thereof.

For self-capacitance-based touch sensing, the plurality of touch electrodes TE may be disposed on the touch screen panel TSP in a form separated from each other.

A touch driving signal TDS may be applied to each of the plurality of touch electrodes TE and a touch sensing signal TSS may be detected from each of the plurality of touch electrodes TE. Each of the plurality of touch electrodes TE may be electrically connected to the touch driving circuit 150 through one or more touch lines TL.

A shape of one touch electrode TE illustrated here is merely an example and may be designed in various shapes.

A size of an area in which one touch electrode TE is formed may correspond to a size of an area in which one subpixel SP is formed, and may be equal to or greater than a size of an area in which two or more subpixels SP are formed.

One touch electrode TE may overlap two or more subpixels SP. In this case, one touch electrode TE may overlap two or more data lines DL and two or more gate lines GL. For example, the size of the area in which one touch electrode TE is formed may correspond to a size of several to tens of subpixel areas.

Meanwhile, the touch screen panel TSP may be may be an external type (also referred to as an add-on type) that is manufactured separately from the display panel 110 and is coupled to the display panel 110 or may be a built-in type (also referred to as an in-cell type or an on-cell type) that is built into the display panel 110.

As an example, when the touch display device 100 is a liquid crystal display device (LCD), the touch electrodes TE may serve as a touch sensor and may also serve as a common electrode that is disposed on the display panel 110 and to which a common voltage for driving the display is applied.

As another example, when the touch display device 100 is an organic light emitting display device, the touch display device 100 may have a top emission structure in which light is emitted to an upper portion of the display panel 110 or a bottom emission structure in which light is emitted to a lower portion of the display panel 110. In this case, the touch electrodes TE may serve as the touch sensor and may also serve as a cathode electrode that is disposed on the display panel 110 and to which the common voltage for driving the display is applied.

When the touch display device 100 is the organic light emitting display device, the touch electrodes TE may be included in the display panel 110 and may be disposed on an upper portion of the encapsulation layer disposed on the transistors and the light emitting element ED. Positions of the touch electrodes TE may be more suitable for the top emission structure. The touch electrodes TE may have a mesh type having openings for luminous efficiency, may be a transparent electrode, or may further include a transparent electrode.

When the touch display device 100 is the organic light emitting display device, the touch electrodes TE may be anode electrodes of the light emitting element ED included in the display panel 110 or may be electrodes located in various layers located below the anode electrodes. The positions of the touch electrodes TE may be more suitable for the bottom emission structure. The touch electrodes TE may have a mesh type having openings for luminous efficiency, may be a transparent electrode, or may further include a transparent electrode.

The touch electrodes TE included in the touch display device 100 may be dedicated electrodes for touch sensing or may be electrodes that may be used for both display driving and touch sensing.

In the touch display device 100, as the size of the display panel 110 increases, a time delay of the touch driving signal TDS applied from the touch driving circuit 150 to the touch electrode TE or the touch sensing signal TSS transmitted from the touch electrode TE to the touch driving circuit 150 may increase.

Figure 4:
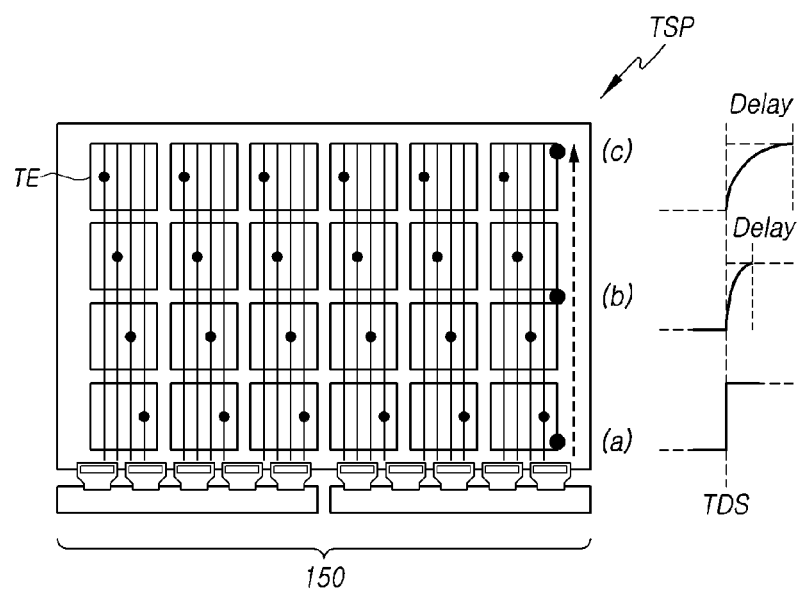
FIG. 4 is a view exemplarily illustrating a case in which a time delay occurs in a process of transmitting a touch signal in the touch display device according to aspects of the present disclosure.

FIG. 4 is a view exemplarily illustrating a case in which a time delay occurs in a process of transmitting a touch signal in the touch display device according to aspects of the present disclosure.

Referring to FIG. 4, in the touch display device 100 according to the aspects of the present disclosure, the touch driving signal TDS generated by the touch driving circuit 150 may have a time delay in the process of being transmitted to the touch electrode TE through the touch line TL.

As a result, the time delay of the touch driving signal TDS increases as the touch electrode TE is located farther away from the touch driving circuit 150, and thus a phenomenon occurs in which a time during which the touch driving signal TDS is maintained at a high level is reduced.

For example, the touch driving signal TDS supplied to an area (a) close to the touch driving circuit 150 may have substantially the same high level period as the touch driving signal TDS generated by the touch driving circuit 150.

However, as the distance from the touch driving circuit 150 increases, the time delay of the touch driving signal TDS increases, so that The high-level period of the touch driving signal TDS reaching the touch electrode TE located in a central area (b) and a far area (c) from the touch driving circuit 150 is reduced compared to a close area (a) from the touch driving circuit 150.

Such a phenomenon appears not only in the case of the touch driving signal TDS transmitted from the touch driving circuit 150 to the touch electrode TE but also in the case of the touch sensing signal TSS transmitted from the touch electrode TE to the touch driving circuit 150.

Accordingly, a deviation occurs in touch performance depending on the position of the display panel 110, and noise increases due to electromagnetic interference of the touch signal and the display signal during touch driving or display driving.

The time delay may further increase due to signal interference between the touch signal and a display driving signal.

As a result, the deviation may occur in touch performance depending on the position of the display panel 110, and a problem may occur in which the touch performance is deteriorated.

The touch display device 100 according to the aspects of the present disclosure may reduce the electromagnetic interference caused by the touch signal and the display signal during touch driving or display driving by disposing a metal shielding layer between the touch electrode and the light emitting layer, which is beneficial to reduce the time delay of the touch signal.

Figure 5:
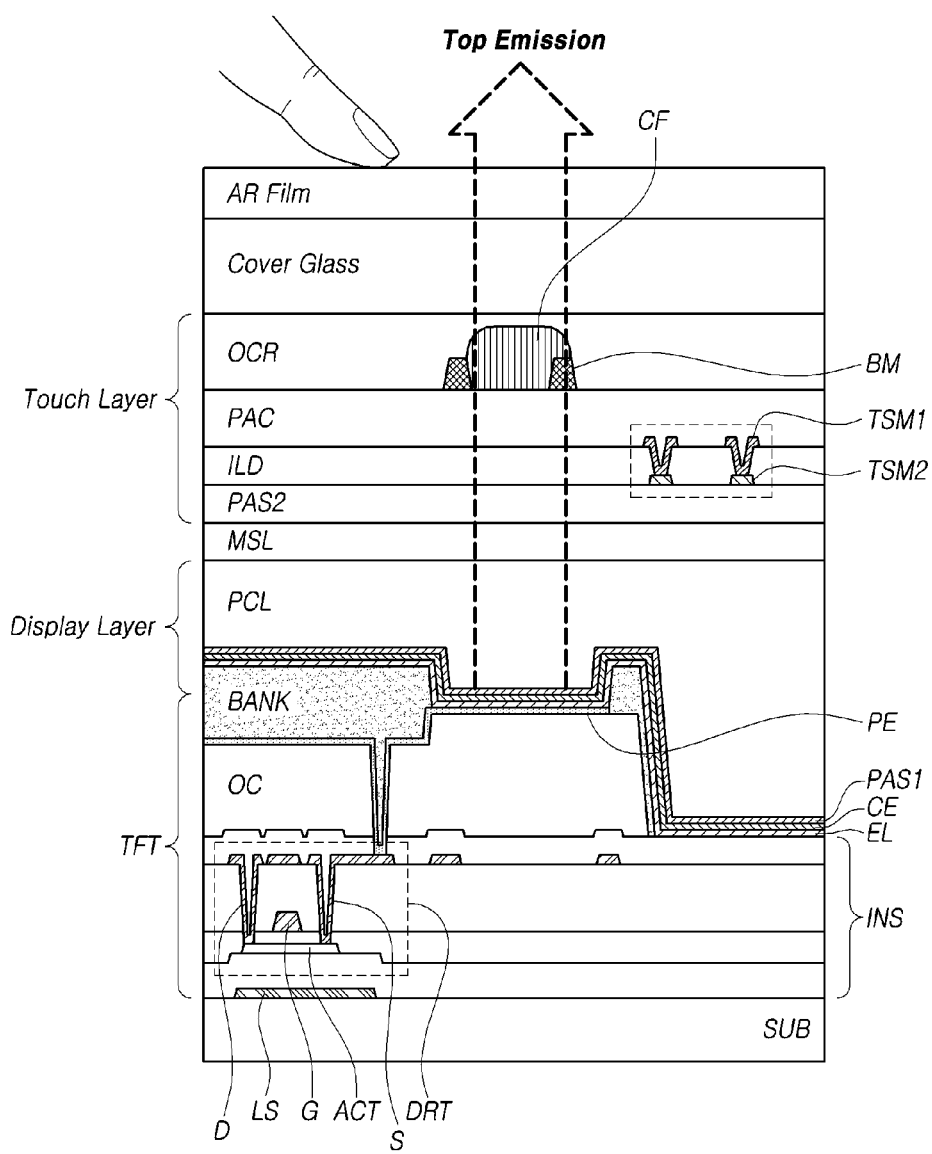
FIG. 5 is a cross-sectional view exemplarily illustrating a top emission structure in which a metal shielding layer is disposed in the touch display device according to aspects of the present disclosure.

FIG. 5 is a cross-sectional view exemplarily illustrating a top emission structure in which a metal shielding layer is disposed in the touch display device according to aspects of the present disclosure.

Referring to FIG. 5, the display panel 110 of the touch display device 100 according to the aspects of the present disclosure may include a substrate SUB, a transistor TFT disposed on the substrate SUB, a display layer formed on the transistor TFT, a touch layer for sensing a touch on the display layer, and a metal shielding layer MSL formed between the display layer and the touch layer.

The metal shielding layer MSL may be formed of an integrated metal plate that covers the display area AA of the display panel 110.

Alternatively, the metal shielding layer MSL may be formed in a shape corresponding to the touch electrode TE. For example, the metal shielding layer MSL may be formed in a mesh type corresponding to a shape of the mesh type touch electrode TE. When the metal shielding layer MSL is formed of the mesh type corresponding to the shape of the touch electrode TE, a light transmittance may be improved compared to the case where the metal shielding layer is formed of an integrated metal plate, so that a luminance of the display panel 110 may be improved.

The display layer may include a pixel electrode PE electrically connected to a source electrode S or a drain electrode D of the transistor TFT, a light emitting layer EL located on the pixel electrode PE, and a cathode electrode CE located on the light emitting layer EL, and encapsulation layers PAS1, PCL, and PAS2 may be formed on the cathode electrode CE.

The transistor TFT may include several insulating layers INS, an active layer ACT, a gate electrode G, the source electrode S, and the drain electrode D. Here, a driving transistor DRT having the source electrode S connected to the pixel electrode PE is exemplary illustrated.

A light shield LS overlapping the active layer ACT may be disposed under the active layer ACT of the transistor TFT.

The display layer constituting the light emitting element ED may be formed on the transistor TFT. The display layer may be composed of the pixel electrode PE, the light emitting layer EL, and the cathode electrode CE.

An overcoat layer OC may be located on the transistor TFT, the pixel electrode PE may be located on the overcoat layer OC, and the pixel electrode PE may be connected to the source electrode S of the transistor TFT through an contact hole of the overcoat layer OC.

In addition, a bank BANK may be located on the pixel electrode PE, and the light emitting layer EL may be disposed on the bank BANK and in an area where the bank BANK is open. In the area where the bank BANK is open, the light emitting layer EL is located on the pixel electrode PE.

The cathode electrode CE is disposed on the light emitting layer EL, and the encapsulation layers PAS1, PCL, and PAS2 are disposed on the cathode electrode CE.

The encapsulation layers PAS1, PCL, and PAS2 may be formed at a position separating the display layer and the touch layer, and in the case of the top emission structure, the encapsulation layers PAS1, PCL, and PAS2 may include one or more inorganic films and one or more organic films.

Accordingly, as an example, the encapsulation layer may be composed of a first encapsulation layer PAS1, a second encapsulation layer PCL, and a third encapsulation layer PAS2, and the first encapsulation layer PAS1 may be an inorganic film, the second encapsulation layer PCL may be an organic film, and the third encapsulation layer PAS2 may be an inorganic film.

In the touch display device 100 having the top emission structure, the touch layer may be located on the encapsulation layers PAS1, PCL, and PAS2.

In addition, color conversion layers such as a color filter CF and a black matrix BM may be disposed on the encapsulation layers PAS1, PCL, and PAS2. Such a structure may be referred to as a color and touch on encapsulation (CToE) structure.

Two touch sensor metals TSM1 and TSM2 may be disposed on the third encapsulation layer PAS2. An interlayer insulating film ILD may be located between the two touch sensor metals TSM1 and TSM2.

The touch electrode TE may be formed using one or more of the two touch sensor metals TSM1 and TSM2. In addition, the touch line TL may be formed using one or more of the two touch sensor metals TSM1 and TSM2.

An insulating layer PAC may be disposed on the two touch sensor metals TSM1 and TSM2, and the color conversion layers (CF and BM) may be disposed thereon. A cover glass to which an anti-reflection film (AR Film) is attached may be attached to the color conversion layer by a transparent adhesive layer OCR.

When the display panel 110 has the top emission structure, the display panel 110 may further include the color filter CF located on the encapsulation layers PAS1, PCL, and PAS2. The color filter CF is located on the encapsulation layers PAS1, PCL, and PAS2, but may be located on the plurality of touch electrodes TE, or may be located under the plurality of touch electrodes TE.

In this case, the metal shielding layer MSL made of a transparent material may be formed between the display layer including the pixel electrode PE and the light emitting layer EL and the touch layer including the touch sensor metals TSM1 and TSM2 in order to reduce interference between a signal according to display driving and a signal according to touch driving.

In the top emission structure, since the encapsulation layers PAS1, PCL, and PAS2 may be formed between the display layer and the touch layer, the metal shielding layer MSL may be. located to be in contact with a part of the encapsulation layers PAS1, PCL, and PAS2.

That is, so as to be electrically insulated from the upper touch electrode TE and the lower light emitting layer EL, the metal shielding layer MSL may be located between the first encapsulation layer PAS1 and the second encapsulation layer PCL, may be located between the second encapsulation layer PCL and the third encapsulation layer PAS2, or may be located above the third encapsulation layer PAS2. Here, a case in which the metal shielding layer MSL is located between the second encapsulation layer PCL and the third encapsulation layer PAS2 is illustrated as an example.

As described above, the touch display device 100 according to the aspects of the present disclosure may reduce the electromagnetic interference caused by the touch signal and the display signal during touch driving or display driving by disposing the metal shielding layer MSL between the touch electrode TE and the light emitting layer EL.

Meanwhile, the touch display device 100 according to the aspects of the present disclosure may also be applied to a bottom emission structure.

Figure 6:
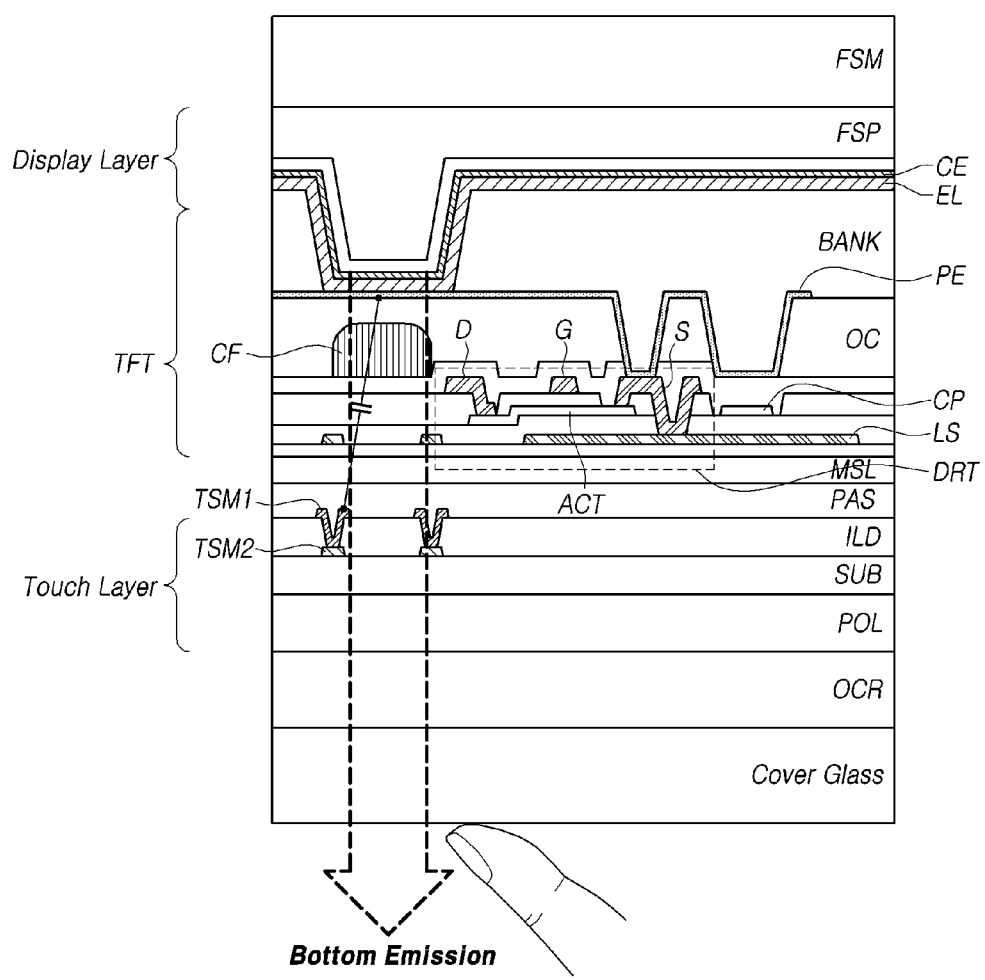
FIG. 6 is a cross-sectional view exemplarily illustrating a bottom emission structure in which a metal shielding layer is disposed in the touch display device according to aspects of the present disclosure.

FIG. 6 is a cross-sectional view exemplarily illustrating a bottom emission structure in which a metal shielding layer is disposed in the touch display device according to aspects of the present disclosure.

Referring to FIG. 6, in the touch display device 100 according to the aspects of the present disclosure, the display panel 110 may include a cover glass, a transparent adhesive layer OCR disposed on the cover glass, a polarizing plate POL disposed on the transparent adhesive layer OCR, and a substrate SUB disposed on the polarizing plate POL.

Two touch sensor metals TSM1 and TSM2 may be disposed on the substrate SUB. An interlayer insulating film ILD may be located between the two touch sensor metals TSM1 and TSM2.

A touch electrode TE may be formed using one or more of the two touch sensor metals TSM1 and TSM2. A touch line TL may be formed using one or more of the two touch sensor metals TSM1 and TSM2.

An encapsulation layer PAS may be located on the two touch sensor metals TSM1 and TSM2 and the interlayer insulating film ILD, and a transparent metal shielding layer MSL may be located between a transistor TFT and the encapsulation layer PAS.

In the bottom emission structure, since the transistor TFT may be formed under the display layer, and the encapsulation layer PAS may be formed between the transistor TFT and the touch layer, the metal shielding layer MSL may be located to be in contact with the encapsulation layer PAS under the transistor TFT.

The transistor TFT may include several insulating layers, an active layer ACT, a gate electrode G, a source electrode S, and a drain electrode D. Here, a driving transistor DRT having the source electrode S connected to a pixel electrode PE is exemplary illustrated.

A light shield LS overlapping the active layer ACT may be disposed under the active layer ACT of the transistor TFT. For channel stabilization of the transistor TFT, the light shield LS may be electrically connected to the source electrode S of the transistor TFT.

A part of the light shield LS may overlap a pattern CP which may be made of the same material as the active layer ACT. This pattern CP may serve to increase a capacitance of a storage capacitor Cst by forming a double storage capacitor Cst in a subpixel SP.

A color filter CF may be disposed on the insulating layer of the transistor TFT. An organic light emitting diode as a light emitting element ED may be formed on the transistor TFT. The organic light emitting diode may be composed of the pixel electrode PE, a light emitting layer EL, and a cathode electrode CE and may form the display layer.

An overcoat layer OC may be located on the transistor TFT and the color filter CF, the pixel electrode PE may be located on the overcoat layer OC, and the pixel electrode PE may be connected to the source electrode S of the transistor TFT through a contact hole of the overcoat layer OC.

In addition, a bank BANK may be located on the pixel electrode PE. The light emitting layer EL may be disposed on the bank BANK and in an area where the bank BANK is open. In the area where the bank BANK is open, the light emitting layer EL is located on the pixel electrode PE.

The cathode electrode CE may be disposed on the light emitting layer EL. A metal encapsulation layer FSM and an adhesive layer FSP having an encapsulation function while attaching the metal sealing layer FSM thereunder may be disposed on the cathode electrode CE.

When the display panel 110 has the bottom emission structure, the two touch sensor metals TSM1 and TSM2 that may constitute a plurality of touch electrodes TE may be disposed under the transistor TFT to form the touch layer.

In the bottom emission structure, by disposing the metal shielding layer MSL between the touch electrode TE and the light emitting layer EL, electromagnetic interference caused by the touch signal and the display signal during touch driving or display driving may be reduced.

The touch display device 100 of the present disclosure may reduce a delay of the touch signal and improve touch performance by applying a reference signal that may be commonly used for touch driving and display driving to the metal shielding layer MSL disposed between the touch electrode TE and the light emitting layer EL.

Figure 7:
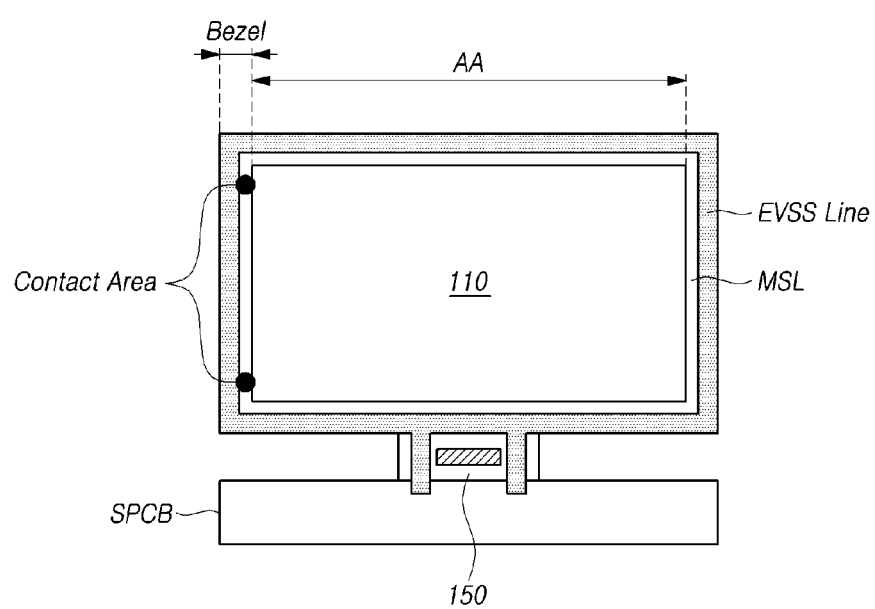
FIG. 7 is a view exemplarily illustrating a structure in which the metal shielding layer disposed between a touch electrode and a light emitting layer and a reference signal line are electrically connected to each other in the touch display device according to aspects of the present disclosure.

FIG. 7 is a view exemplarily illustrating a structure in which a metal shielding layer disposed between a touch electrode and a light emitting layer and a reference signal line are electrically connected to each other in the touch display device according to aspects of the present disclosure.

Referring to FIG. 7, the touch display device 100 according to the aspects of the present disclosure may reduce the delay of the touch signal and improve the touch performance by disposing the metal shielding layer MSL between the touch electrode TE and the light emitting layer EL and applying the reference signal that may be commonly used for touch driving and display driving to the metal shielding layer MSL.

One touch driving circuit 150 or a plurality of touch driving circuits 150 may be disposed between a source printed circuit board SPCB and the display panel 110, and here, a case in which one touch driving circuit 150 is disposed is illustrated as an example.

As described above, the metal shielding layer MSL may be formed between the touch electrode TE constituting the touch layer and the light emitting layer EL constituting the display layer as an integrated metal plate overlapping the display area AA of the display panel 110. Alternatively, the metal shielding layer MSL may be formed in a mesh type so as to correspond to a shape of the mesh type touch electrode TE.

In this case, the reference signal that may be commonly used for touch driving and display driving may be a base voltage EVSS.

The base voltage EVSS may be a ground voltage or a voltage slightly higher or lower than the ground voltage. The base voltage EVSS may be a voltage applied to the cathode electrode CE of the light emitting element ED constituting the subpixel SP.

A base voltage line EVSS Line may be disposed along a bezel area of the display panel 110 and may be formed in a structure surrounding the display area AA. The base voltage line EVSS Line may be branched from the structure surrounding the display area AA and may be electrically connected to the cathode electrode CE of the light emitting element ED located in the corresponding subpixel SP.

The base voltage line EVSS Line may extend along a side surface of the touch driving circuit 150 connecting the source printed circuit board SPCB and the display panel 110 to supply the base voltage EVSS generated by a power management circuit to the base voltage line EVSS Line formed in the bezel area of the display panel 110.

A partial area of the base voltage line EVSS Line may be electrically connected to the metal shielding layer MSL in the bezel area so that the base voltage line EVSS Line may apply the base voltage EVSS corresponding to the reference signal to the metal shielding layer MSL disposed between the touch electrode TE and the light emitting layer EL.

Here, a case in which the base voltage line EVSS Line and the metal shielding layer MSL are electrically connected in the bezel area formed on a left side of the display panel 110 is illustrated.

As described above, the touch display device 100 of the present disclosure may reduce the delay of the touch signal and improve the touch performance by applying the base voltage EVSS that may be commonly used for touch driving and display driving to the metal shielding layer MSL disposed between the touch electrode TE and the light emitting layer EL.

Meanwhile, when noise is generated in the base voltage EVSS, the touch display device 100 of the present disclosure may reduce the delay of the touch signal and more effectively improve the touch performance by generating a compensated base voltage EVSS_Comp capable of canceling the noise and applying the compensated base voltage EVSS_Comp to the metal shielding layer MSL disposed between the touch electrode TE and the light emitting layers EL.

Figure 8:
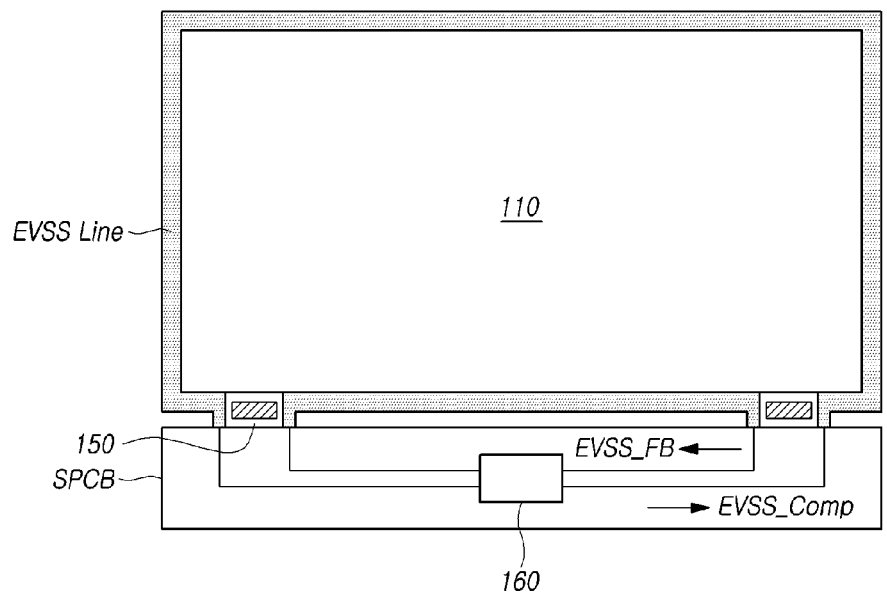
FIG. 8 is a view exemplarily illustrating a case in which a compensation circuit for canceling noise of a base voltage used as a reference signal is disposed in the touch display device according to aspects of the present disclosure.

FIG. 8 is a view exemplarily illustrating a case in which a compensation circuit for canceling noise of a base voltage used as a reference signal is disposed in the touch display device according to aspects of the present disclosure.

Referring to FIG. 8, the touch display device 100 according to the aspects of the present disclosure may reduce the delay of the touch signal and more effectively improve the touch performance by generating the compensated base voltage EVSS_Comp capable of canceling noise generated in the base voltage line EVSS Line in a compensation circuit 160 located on the source printed circuit board SPCB and applying the compensated base voltage EVSS_Comp to the metal shielding layer MSL located between the touch electrode TE and the light emitting layer EL.

One touch driving circuit 150 or a plurality of touch driving circuits 150 may be disposed between the source printed circuit board SPCB and the display panel 110, and here, a case in which two touch driving circuit 150 are disposed on both sides of the display panel 110 is illustrated as an example.

The base voltage line EVSS Line may be disposed along the bezel area of the display panel 110 and may be formed in a structure surrounding the display area AA. The base voltage line EVSS Line may be branched from the structure surrounding the display area AA and may be electrically connected to the cathode electrode CE of the light emitting element ED located in the corresponding subpixel SP.

The base voltage line EVSS Line may extend along one surface of the touch driving circuit 150 connecting the source printed circuit board SPCB and the display panel 110 to supply the base voltage EVSS generated by a power management circuit to the base voltage line EVSS Line formed in the bezel area of the display panel 110.

The compensation circuit 160 may be electrically connected to one side of the base voltage line EVSS Line to detect a feedback base voltage EVSS_FB.

In this case, a position at which the compensation circuit 160 is connected to the base voltage line EVSS Line in order to detect the feedback base voltage EVSS_FB may be variously determined. For example, the compensation circuit 160 may be connected to a specific position on the Chip On Film (COF) forming the touch driving circuit 150 to detect the feedback base voltage EVSS_FB.

The compensation circuit 160 may reduce the delay of the touch signal and more effectively improve the touch performance by generating the compensated base voltage EVSS_Comp having a form in which a noise section is inverted so as to cancel noise included in the feedback base voltage EVSS_FB and applying the compensated base voltage EVSS_Comp to the base voltage line EVSS Line.

Figure 9:
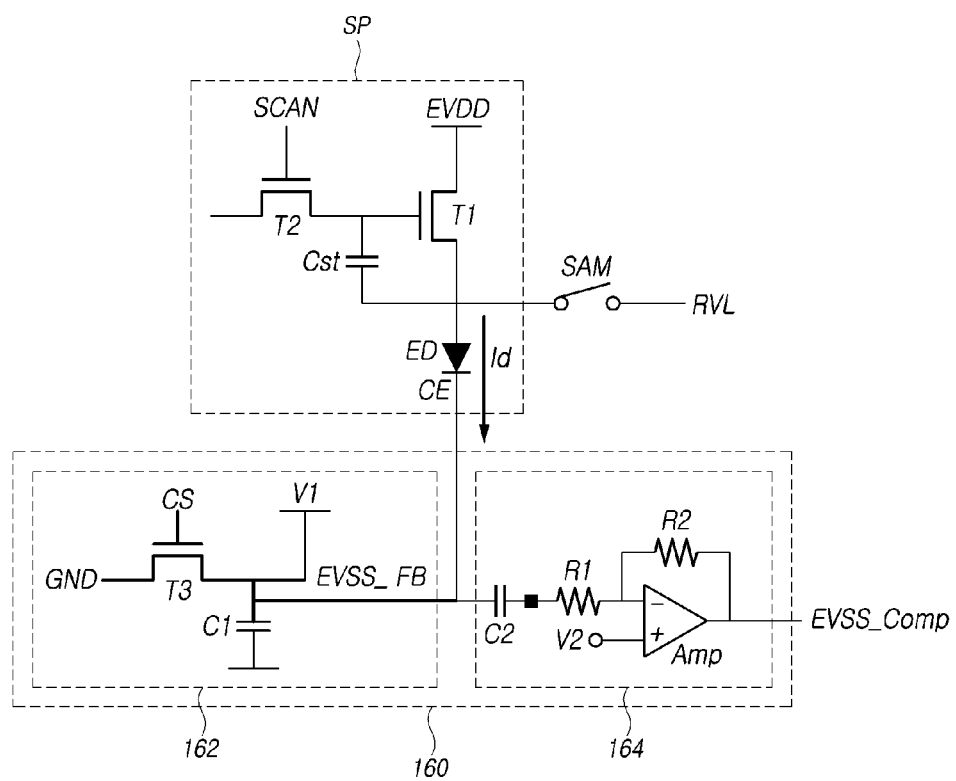
FIGS. 9 and 10 are views exemplarily illustrating a configuration of the compensation circuit in the touch display device according to aspects of the present disclosure.
Figure 10:
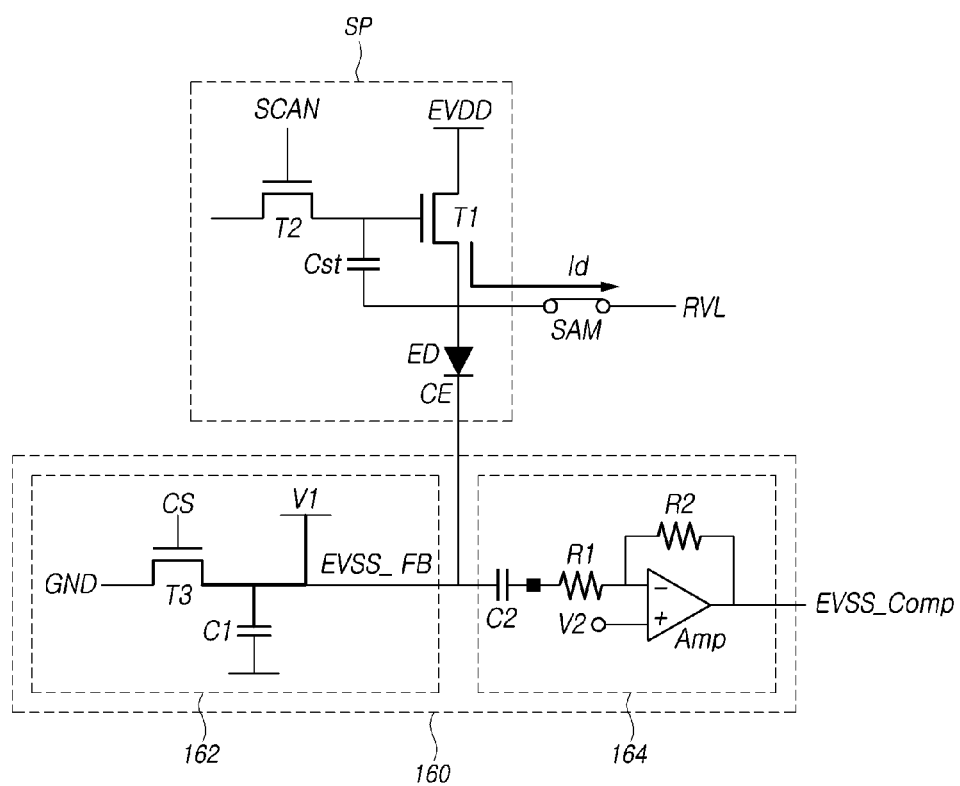

FIGS. 9 and 10 are views exemplary illustrating a configuration of a compensation circuit in the touch display device according to aspects of the present disclosure.

Here, the compensation circuit 160 may generate the compensated base voltage EVSS_Comp in which a noise signal is inverted in order to cancel noise within a predetermined period.

For example, the touch display device 100 according to the aspects of the present disclosure may generate the compensated base voltage EVSS_Comp in which the noise signal is inverted in order to cancel noise during a period in which a characteristic value of the subpixel SP is sensed through a reference voltage line RVL.

Accordingly, FIG. 9 illustrates a configuration of compensation circuits of an emission period of the subpixel SP, and FIG. 10 illustrates a configuration of compensation circuits of a period in which the characteristic value of the subpixel SP is sensed.

Referring to FIGS. 9 and 10, the compensation circuit 160 of the touch display device 100 according to the aspects of the present disclosure may include a control circuit 162 and an inverting circuit 164.

The control circuit 162 may be located between the ground GND and the cathode electrode CE of the light emitting element ED to control an operation of the inverting circuit 164.

The control circuit 162 may include a control transistor T3 in which a drain electrode is connected to the ground GND, a control signal CS is applied to a gate electrode, and a first voltage V1 is applied to a source electrode and a first capacitor C1 connected to the source electrode of the control transistor T3. The first voltage V1 may be a level of most stable base voltage EVSS.

The inverting circuit 164 may include an amplifier Amp in which a second voltage V2 is applied to a non-inverting input terminal (+), a second capacitor C2 connected to the cathode electrode CE of the light emitting element ED, a first resistor R1 connected between the second capacitor C2 and an inverting input terminal (−) of the amplifier Amp, and a second resistor R2 connected between the inverting input terminal and an output terminal of the amplifier Amp.

In the example of FIG. 9, The control transistor T3 is turned on during a period in which the control signal CS of a high level is applied to the gate electrode to supply a ground voltage to the inverting circuit 164.

The ground voltage applied to the inverting circuit 164 is applied to the inverting input terminal (−) of the amplifier Amp through the second capacitor C2 and the first resistor R1, and the amplifier Amp amplifies a difference between the ground voltage and the second voltage V2 to output the compensated base voltage EVSS_Comp.

Therefore, when the second voltage V2 applied to the non-inverting input terminal (+) of the amplifier Amp has a level the same as or similar to the ground voltage, the compensated base voltage EVSS_Comp will be output at a level close to zero during a period in which the control signal CS is applied at a high level.

In this case, during the period in which the high-level control signal CS is applied to the gate electrode of the control transistor T3, since a ground voltage corresponding to the base voltage EVSS may be applied to the cathode electrode CE of the light emitting element ED, the period to which the high-level control signal CS is applied may correspond to the emission period to which a driving current Id is applied through the light emitting element ED.

Therefore, during the period in which the high-level control signal CS is applied to the gate electrode of the control transistor T3, a sampling switch SAM for sensing the characteristic value of the subpixel SP may be turned off.

As a result, the compensated base voltage EVSS_Comp may represent a level close to zero during the emission period in which the light emitting element ED of the subpixel SP displays an image.

Meanwhile, in the example of FIG. 10, during a period in which the control signal CS of a low level is applied to the gate electrode, the control transistor T3 may be turned off to supply the feedback base voltage EVSS_FB to the inverting circuit 164.

The feedback base voltage EVSS_FB applied to the inverting circuit 164 is applied to the inverting input terminal (−) of the amplifier Amp through the second capacitor C2 and the first resistor R1, and the amplifier Amp amplifies a difference between the feedback base voltage EVSS_FB and the second voltage V2 to output the compensated base voltage EVSS_Comp.

In this case, the second voltage V2 applied to the non-inverting input terminal (+) of the amplifier Amp may have the level the same as or similar to the ground voltage.

Therefore, during the period in which the low-level control signal CS is applied, the compensated base voltage EVSS_Comp will represent a value that the difference between the feedback base voltage EVSS_FB and the second voltage V2 corresponding to the ground voltage is inverted and amplified.

In this case, since the feedback base voltage EVSS_FB may be applied to the cathode electrode CE of the light emitting element ED during the period in which the low-level control signal CS is applied to the gate electrode of the control transistor T3, the period to which the low-level control signal CS is applied may correspond to a sensing period for sensing the characteristic value of the subpixel SP.

Therefore, during the period in which the low-level control signal CS is applied to the gate electrode of the control transistor T3, the sampling switch SAM for sensing the characteristic value of the subpixel SP may be turned on.

As a result, during the sensing period in which the characteristic value of the subpixel SP is sensed, the compensated base voltage EVSS Comp in which the difference between the feedback base voltage EVSS_FB and the second voltage V2 is inverted and amplified may be output.

Figure 11:
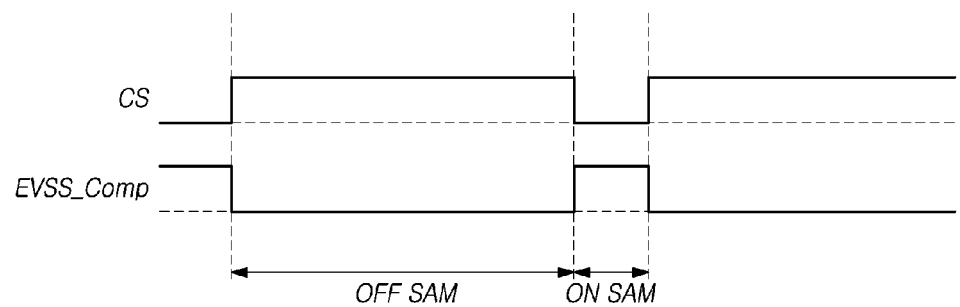
FIG. 11 is a signal waveform diagram illustrating an operation of the compensation circuit in the touch display device according to aspects of the present disclosure.

FIG. 11 is a signal waveform diagram illustrating an operation of a compensation circuit in the touch display device according to aspects of the present disclosure.

Referring to FIG. 11, the touch display device 100 according to the aspects of the present disclosure outputs the compensated base voltage EVSS_Comp close to zero during the emission period in which the sampling switch SAM is turned off, but the compensated base voltage EVSS_Comp in which the feedback base voltage EVSS_FB is inverted and amplified so that noise appearing on the base voltage line EVSS Line may be canceled, may be output during the characteristic value sensing period in which the sampling switch SAM is turned on.

Therefore, during the sensing period in which the characteristic value of the subpixel SP is sensed, the noise appearing on the base voltage line EVSS Line may be canceled through the compensated base voltage EVSS_Comp, thereby reducing the delay of the touch signal and improving the touch performance.

Figure 12:
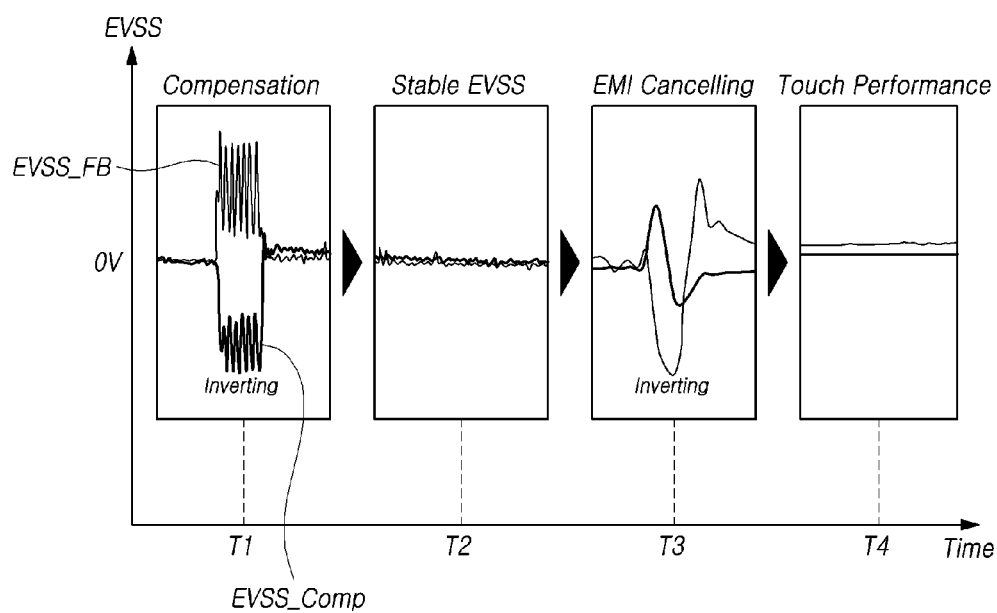
FIG. 12 is a signal waveform diagram illustrating an effect of reducing electromagnetic interference and improving touch performance through a compensated base voltage in the touch display device according to aspects of the present disclosure.

FIG. 12 is a signal waveform diagram illustrating an effect of reducing electromagnetic interference and improving touch performance through a compensated base voltage in the touch display device according to aspects of the present disclosure.

Referring to FIG. 12, in the touch display device 100 according to the aspects of the present disclosure, the compensated base voltage EVSS_Comp in which the feedback base voltage EVSS_FB is inverted and amplified so that noise included on the base voltage line EVSS Line may be canceled, may be output during the characteristic value sensing period in which the sampling switch SAM is turned on.

Since the compensated base voltage EVSS_Comp is supplied through the base voltage line EVSS Line, the base voltage EVSS may maintain a stable state.

In addition, since the compensated base voltage EVSS_Comp is applied to the metal shielding layer MSL disposed between the touch electrode TE and the light emitting layer EL, the electromagnetic interference (EMI) and the delay of the touch signal that appears between the touch electrode TE and the light emitting layer EL may be reduced to improve the touch performance.

Figure 13:
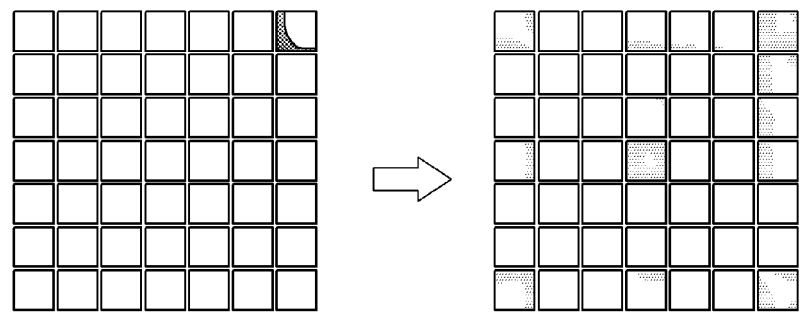
FIG. 13 is a view illustrating an effect that electromagnetic interference of a display panel is reduced by applying the compensated base voltage to the metal shielding layer disposed between the touch electrode and the light emitting layer in the touch display device according to aspects of the present disclosure.
Figure 14:
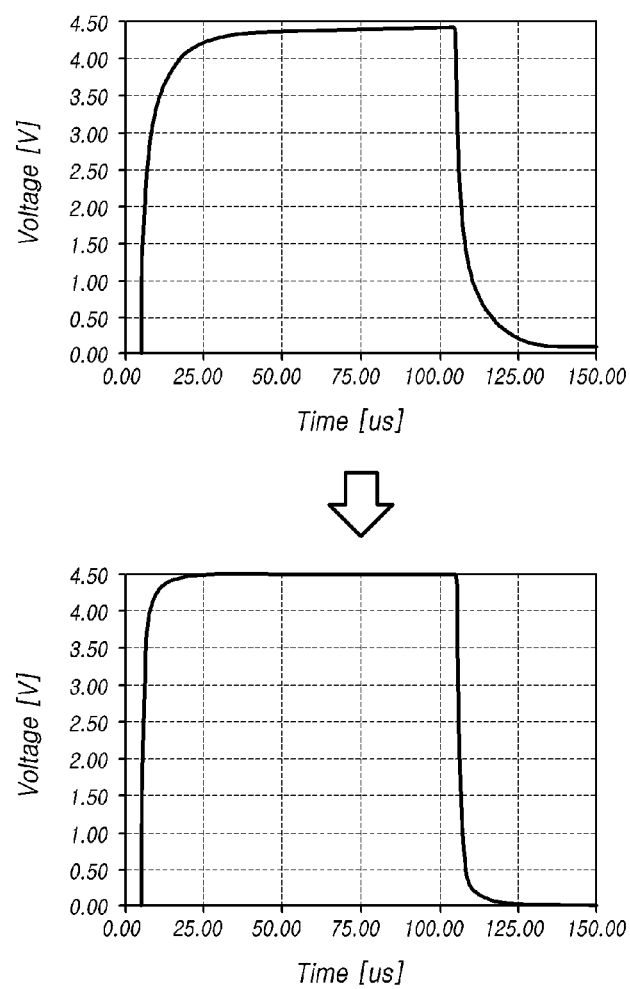
FIG. 14 is a view illustrating an effect that a time delay of a touch signal is reduced by applying the compensated base voltage to the metal shielding layer disposed between the touch electrode and the light emitting layer in the touch display device according to aspects of the present disclosure.
Figure 15:
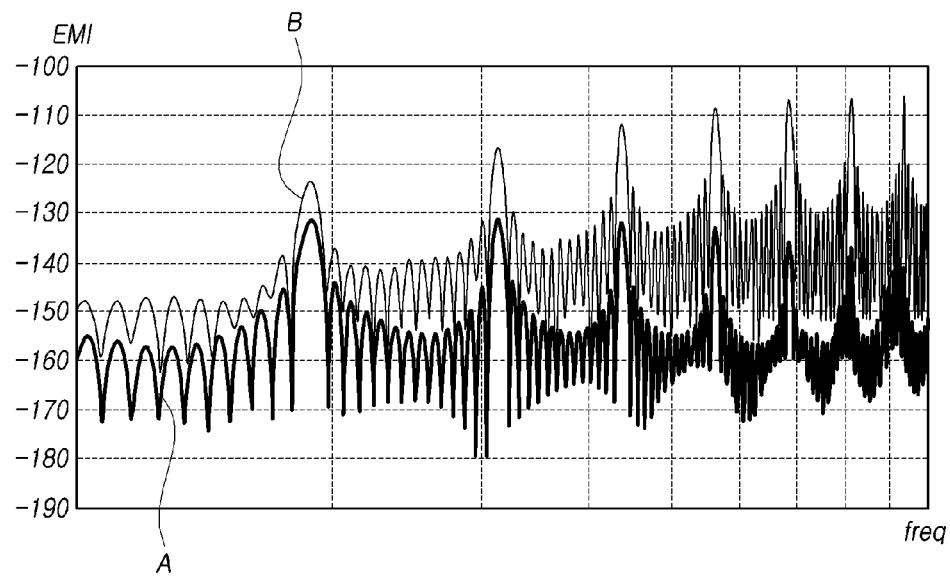
FIG. 15 is a view illustrating an effect that touch performance is improved by applying the compensated base voltage to the metal shielding layer disposed between the touch electrode and the light emitting layer in the touch display device according to aspects of the present disclosure.

FIG. 13 is a view illustrating an effect that electromagnetic interference of the display panel is reduced by applying a compensated base voltage to a metal shielding layer disposed between a touch electrode and a light emitting layer in the touch display device according to aspects of the present disclosure, FIG. 14 is a view illustrating an effect that a time delay of a touch signal is reduced, and FIG. 15 is a view illustrating an effect that touch performance is improved.

Referring to FIG. 13, in the touch display device 100 according to the aspects of the present disclosure, a luminance deviation due to electromagnetic interference occurring during touch driving and display driving may be reduced by disposing the metal shielding layer MSL between the touch electrode TE and the light emitting layer EL and applying the compensated base voltage EVSS_Comp that may be commonly used for touch driving and display driving to the metal shielding layer MSL.

In addition, as shown in FIG. 14, the delay of the touch signal may be reduced by applying the compensated base voltage EVSS_Comp that may be commonly used for touch driving and display driving to the metal shielding layer MSL.

In addition, referring to FIG. 15 illustrating electromagnetic interference according to frequency, it can be seen that when the compensated base voltage EVSS_Comp that may be commonly used for touch driving and display driving is applied to the metal shielding layer MSL (case B), the electromagnetic interference is reduced and the touch performance is improved compared to a case in which the compensated base voltage EVSS_Comp is not applied (case A).

Meanwhile, in the touch display device 100 according to the aspects of the present disclosure, the cathode electrode CE located between the touch electrode TE and the light emitting layer EL may be used as the metal shielding layer without additionally disposing the metal shielding layer MSL between the touch electrode TE and the light emitting layer EL.

Figure 16:
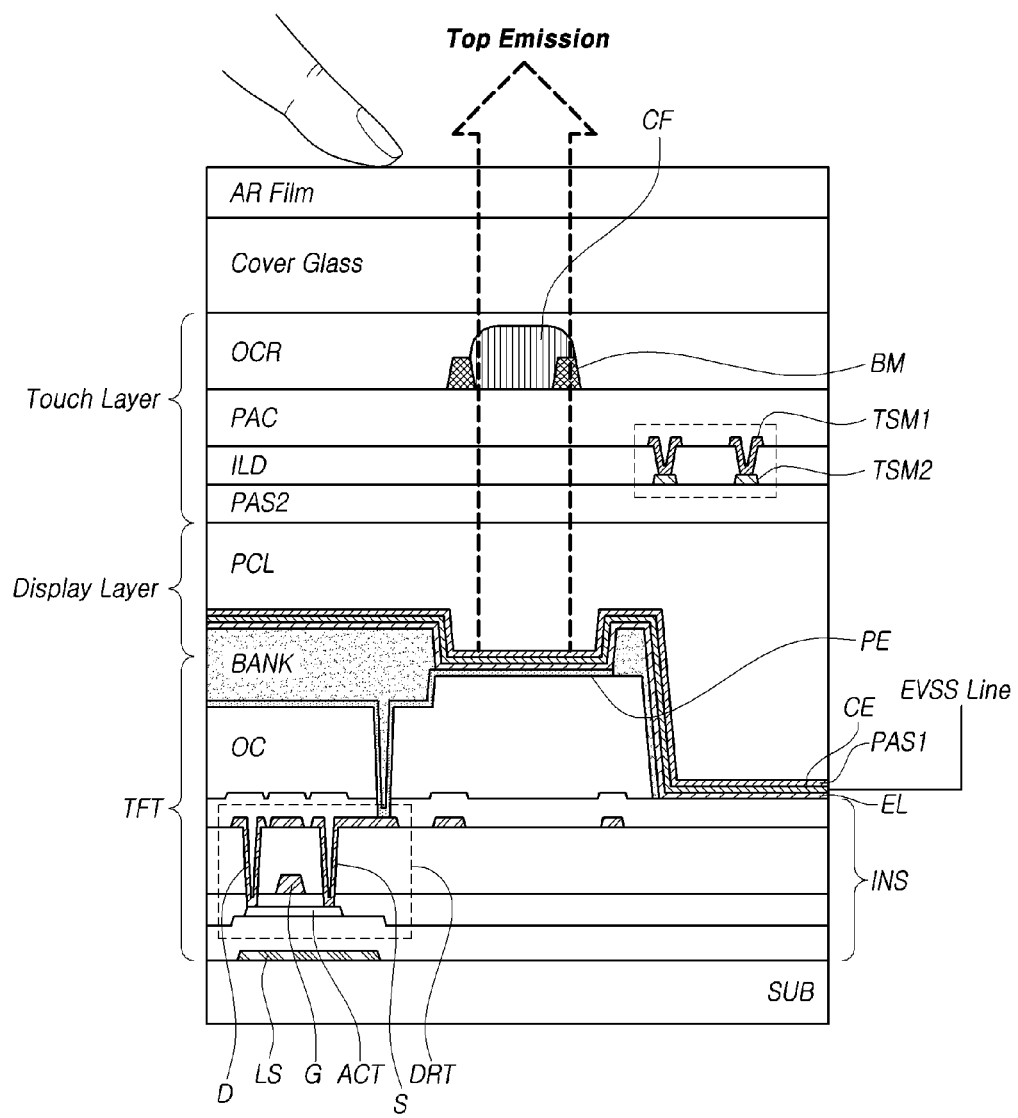
FIG. 16 is a cross-sectional view exemplarily illustrating a top emission structure in which the compensated base voltage is applied using a cathode electrode as the metal shielding layer in the touch display device according to aspects of the present disclosure.

FIG. 16 is a cross-sectional view exemplarily illustrating a top emission structure in which the compensated base voltage is applied using the cathode electrode as the metal shielding layer in the touch display device according to aspects of the present disclosure.

Referring to FIG. 16, the display panel 110 of the touch display device 100 according to the aspects of the present disclosure may include a substrate SUB, a transistor TFT disposed on the substrate SUB, a display layer formed on the transistor TFT, and a touch layer formed on the display layer to sense a touch.

In this case, the touch display device 100 may use a cathode electrode CE located between a light emitting layer EL of the display layer and a touch electrode TE of the touch layer as a metal shielding layer.

In this case, the cathode electrode CE may be formed of an integrated transparent metal plate that covers the display area AA of the display panel 110.

The display layer may include a pixel electrode PE electrically connected to a source electrode S or a drain electrode D of the transistor TFT, the light emitting layer EL located on the pixel electrode PE, and the cathode electrode CE located on the light emitting layer EL, and encapsulation layers PAS1, PCL, and PAS2 may be formed on the cathode electrode CE.

The transistor TFT may include several insulating layers INS, an active layer ACT, a gate electrode G, the source electrode S, and the drain electrode D. Here, a driving transistor DRT having the source electrode S connected to the pixel electrode PE is exemplary illustrated.

A light shield LS overlapping the active layer ACT may be disposed under the active layer ACT of the transistor TFT.

The display layer constituting a light emitting element ED may be formed on the transistor TFT. The display layer may be composed of the pixel electrode PE, the light emitting layer EL, and the cathode electrode CE.

An overcoat layer OC may be located on the transistor TFT, the pixel electrode PE may be located on the overcoat layer OC, and the pixel electrode PE may be connected to the source electrode S of the transistor TFT through an contact hole of the overcoat layer OC.

In addition, a bank BANK may be located on the pixel electrode PE, and the light emitting layer EL may be disposed on the bank BANK and in an area where the bank BANK is open. In the area where the bank BANK is open, the light emitting layer EL is located on the pixel electrode PE.

The cathode electrode CE is disposed on the light emitting layer EL, and the encapsulation layers PAS1, PCL, and PAS2 are disposed on the cathode electrode CE.

The encapsulation layers PAS1, PCL, and PAS2 may be formed at a position separating the display layer and the touch layer, and in the case of the top emission structure, the encapsulation layers PAS1, PCL, and PAS2 may include one or more inorganic films and one or more organic films.

Accordingly, as an example, the encapsulation layer may be composed of a first encapsulation layer PAS1, a second encapsulation layer PCL, and a third encapsulation layer PAS2, and the first encapsulation layer PAS1 may be an inorganic film, the second encapsulation layer PCL may be an organic film, and the third encapsulation layer PAS2 may be an inorganic film.

In the touch display device 100 having the top emission structure, the touch layer may be located on the encapsulation layers PAS1, PCL, and PAS2.

In addition, color conversion layers such as a color filter CF and a black matrix BM may be disposed on the encapsulation layers PAS1, PCL, and PAS2.

Two touch sensor metals TSM1 and TSM2 may be disposed on the third encapsulation layer PAS2. An interlayer insulating film ILD may be located between the two touch sensor metals TSM1 and TSM2.

The touch electrode TE may be formed using one or more of the two touch sensor metals TSM1 and TSM2. In addition, the touch line TL may be formed using one or more of the two touch sensor metals TSM1 and TSM2.

An insulating layer PAC may be disposed on the two touch sensor metals TSM1 and TSM2, and the color conversion layers (CF and BM) may be disposed thereon. A cover glass to which an anti-reflection film (AR Film) is attached may be attached to the color conversion layer by a transparent adhesive layer OCR.

When the display panel 110 has the top emission structure, the display panel 110 may further include the color filter CF located on the encapsulation layers PAS1, PCL, and PAS2. The color filter CF is located on the encapsulation layers PAS1, PCL, and PAS2, but may be located on a plurality of touch electrodes TE, or may be located under the plurality of touch electrodes TE.

In this case, since the cathode electrode CE is located between the light emitting layer EL of the display layer and the touch electrode TE of the touch layer, it is possible to reduce interference between a signal according to display driving and a signal according to touch driving by configuring the cathode electrode CE with the metal shielding layer made of a transparent material.

In this case, by connecting the cathode electrode CE to the base voltage line EVSS Line and applying the compensated base voltage EVSS_Comp in which noise is canceled as a reference signal that may be commonly used for touch driving and display driving, in addition to reducing the electromagnetic interference appearing in a process of touch driving and display driving, it is also possible to reduce the delay of the touch signal and improve the touch performance.

The aspects of the present disclosure described above will be briefly described as follows.

A touch display device 100 according to aspects of the present disclosure may include: a display layer including a light emitting layer EL; a touch layer including a touch electrode TE; a metal shielding layer MSL disposed between the light emitting layer EL and the touch electrode TE; a reference signal line electrically connected to the metal shielding layer MSL; and a compensation circuit 160 configured to supply a reference signal through the reference signal line.

The display layer may include: a transistor TFT for driving the light emitting layer EL; a pixel electrode PE located under the light emitting layer EL and electrically connected to the transistor TFT; a cathode electrode CE located on the light emitting layer EL; and an encapsulation layer PAS formed on the cathode electrode CE.

The touch layer may include: an interlayer insulating film ILD; and the touch electrode TE disposed on the interlayer insulating film ILD and made of at least one touch sensor metal TSM.

The display layer may have a structure in which light is emitted upward by being located below the touch layer.

The display layer may have a structure in which light is emitted downward by being located above the touch layer.

The metal shielding layer MSL may be made of a transparent metal material that covers a display panel 110 (i.e. a display area of the display panel 110).

The metal shielding layer MSL may be a cathode electrode CE located on the light emitting layer EL.

The reference signal line may be a base voltage line EVSS Line disposed so as to surround a periphery of the display panel 110.

The reference signal line may be electrically connected to the metal shielding layer MSL in a bezel area of the display panel 110.

The compensation circuit 160 may include: an inverting circuit 164 configured to generate a compensation reference signal by inverting a signal of the cathode electrode CE located on the light emitting layer EL; and a control circuit 162 located between a ground GND and the cathode electrode CE to control an operation of the inverting circuit 164.

The control circuit 162 may include: a control transistor T3 in which a drain electrode is connected to the ground GND, a control signal CS is applied to a gate electrode, and a feedback base voltage EVSS_FB is applied to a source electrode; and a first capacitor C1 connected to the source electrode of the control transistor T3.

The inverting circuit 164 may include: an amplifier Amp to which a second voltage V2 is applied to a non-inverting input terminal (+); a second capacitor C2 connected to the cathode electrode CE; a first resistor R1 connected between the second capacitor C2 and an inverting input terminal (−) of the amplifier Amp; and a second resistor R2 connected between the inverting input terminal (−) and an output terminal of the amplifier Amp.

The compensation circuit 160 may generate the compensation reference signal by inverting and amplifying noise introduced into the cathode electrode CE during a sensing period in which a characteristic value of a subpixel SP consisting of the light emitting layer EL is sensed.

In addition, a display panel 110 according to aspects of the present disclosure may include: a display layer including a light emitting layer EL; a touch layer including a touch electrode TE; a metal shielding layer MSL disposed between the light emitting layer EL and the touch electrode TE; and a reference signal line electrically connected to the metal shielding layer MSL.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
   a display layer including a light emitting layer;
   a touch layer including a touch electrode;
   a metal shielding layer disposed between the light emitting layer and the touch electrode;
   a reference signal line electrically connected to the metal shielding layer; and
   a compensation circuit configured to supply a reference signal through the reference signal line.

2. The touch display device of claim 1, wherein the display layer includes:
   a transistor configured to drive the light emitting layer;
   a pixel electrode disposed under the light emitting layer and electrically connected to the transistor;
   a cathode electrode located on the light emitting layer; and
   an encapsulation layer disposed on the cathode electrode.

3. The touch display device of claim 1, wherein the touch layer includes an interlayer insulating film, and
   wherein the touch electrode is disposed on the interlayer insulating film and made of at least one touch sensor metal.

4. The touch display device of claim 1, wherein the display layer has a structure in which light is emitted upward by being located below the touch layer.

5. The touch display device of claim 1, wherein the display layer has a structure in which light is emitted downward by being located above the touch layer.

6. The touch display device of claim 1, wherein the metal shielding layer is made of a transparent metal material that covers a display area of a display panel of the touch display device, and the display panel includes the display layer, the touch layer and the metal shielding layer.

7. The touch display device of claim 4, wherein the metal shielding layer is a cathode electrode located on the light emitting layer.

8. The touch display device of claim 1, wherein the reference signal line is a base voltage line disposed to surround a periphery of a display panel of the touch display device, the display panel includes the display layer, the touch layer, and the metal shielding layer.

9. The touch display device of claim 8, wherein the reference signal line is electrically connected to the metal shielding layer in a bezel area of the display panel.

10. The touch display device of claim 1, wherein the compensation circuit includes:
    an inverting circuit configured to generate a compensation reference signal by inverting a signal of a cathode electrode located on the light emitting layer; and
    a control circuit located between a ground and the cathode electrode to control an operation of the inverting circuit.

11. The touch display device of claim 10, wherein the control circuit includes:
    a control transistor in which a drain electrode is connected to the ground, a control signal is applied to a gate electrode, and a first voltage is applied to a source electrode; and
    a first capacitor connected to the source electrode of the control transistor.

12. The touch display device of claim 10, wherein the inverting circuit includes:

an amplifier in which a second voltage is applied to a non-inverting input terminal;
a second capacitor connected to the cathode electrode;
a first resistor connected between the second capacitor and an inverting input terminal of the amplifier; and
a second resistor connected between the inverting input terminal and an output terminal of the amplifier.

13. The touch display device of claim 10, wherein the compensation circuit generates the compensation reference signal by inverting and amplifying noise introduced into the cathode electrode during a sensing period in which a characteristic value of a subpixel composed of the light emitting layer is sensed.

14. A display panel comprising:
a display layer including a light emitting layer;
a touch layer including a touch electrode;
a metal shielding layer disposed between the light emitting layer and the touch electrode; and
a reference signal line electrically connected to the metal shielding layer.

15. The display panel of claim 14, wherein the display layer includes:
a transistor configured to drive the light emitting layer;
a pixel electrode disposed under the light emitting layer and electrically connected to the transistor;
a cathode electrode located on the light emitting layer; and
an encapsulation layer formed on the cathode electrode.

16. The display panel of claim 14, wherein the touch layer includes an interlayer insulating film; and the touch electrode disposed on the interlayer insulating film and made of at least one touch sensor metal.

17. The display panel of claim 14, wherein the metal shielding layer is made of a transparent metal material.

18. The display panel of claim 14, wherein the metal shielding layer is a cathode electrode configured to drive the light emitting layer.

19. The display panel of claim 14, wherein the metal shielding layer is formed in a shape corresponding to the touch electrode.

20. The display panel of claim 14, wherein the reference signal line is a base voltage line disposed to surround a periphery of the display panel.

* * * * *